Jan. 8, 1963 L. E. RUIDISCH ETAL 3,072,714
ESTER RECOVERY PROCESS
Filed May 5, 1959
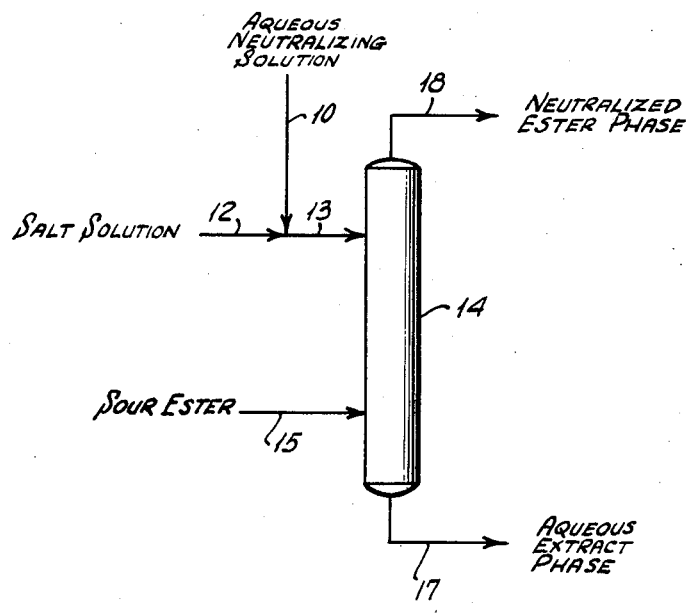

United States Patent Office 3,072,714
Patented Jan. 8, 1963

3,072,714
ESTER RECOVERY PROCESS
Louis E. Ruidisch and Robert Y. Heisler, Fishkill, N.Y., assignors to Texaco Inc., New York, N.Y., a corporation of Delaware
Filed May 5, 1959, Ser. No. 811,031
1 Claim. (Cl. 260—499)

The instant invention relates to a process for separating substantially water insoluble esters of lower aliphatic carboxylic acids from mixtures thereof with the corresponding free carboxylic acid and strong mineral acid, for example, for use as a step in the recovery of such ester from the reaction product of condensing an olefin with the carboxylic acid in the presence of sulfuric acid in conventional manner. Such water insoluble esters include those having a $C_{3+}$ alkyl radical, generally propyl to amyl, and the acid moiety of the ester generally is formed from a $C_{3-5}$ fatty acid.

The esters of this class have good solvent power for organic substances. Certain tertiary alkyl esters of the lower carboxylic acids, notably t-butyl acetate, are valuable additives for improving the octane rating of high quality leaded gasolines.

From a standpoint of equipment corrosion or product sensitivity (tertiary butyl acetate and similar esters will decompose when heated in the presence of even a very small amount of strong mineral acid such as sulfuric) it is eminently desirable to remove the mineral acid from an ester-rich phase under mild conditions before working up the ester into a finished product or an intermediate. Such free carboxylic acid that is present is also separated desirably at the same time and also under conditions which do not complicate the recovery and working up of the ester product (lower tertiary alkyl esters such as tertiary butyl acetate will decompose to a substantial extent into isobutylene and acetic acid when heated for prolonged periods in the presence of a substantial quantity of free acetic acid).

Our process has the virtue of simultaneously sequestering the mineral acid (by neutralization) and separating the preponderance of the carboxylic acid from the ester product by washing. Furthermore, the resulting mineral acid salt made with the neutralizing agent can assist in making an effective phase separation between the aqueous acidic extract solution and the ester-containing raffinate by both increasing density of the extract and establishing "salting-out" conditions therein.

Broadly our process comprises: passing a mixture of the ester, the mineral acid, and the carboxylic acid in the liquid phase into an extraction zone, therein extracting said mixture in the liquid phase with a mobile aqueous dispersion of a neutralizing substance capable of forming a salt with said mineral acid, said neutralizing substance being present in a proportion at least sufficient to substantially completely neutralize said mineral acid, stratifying the resultant liquid organic and aqueous liquid phase, and withdrawing said stratified phase from said extraction zone.

The drawing is a flow diagram showing how our process can be operated. In place of a countercurrent contacting system a batch system or successive batch system or a co-current system can, of course, be employed, but the counter-current system is preferred. The drawing will be discussed in detail hereinafter.

Suitable neutralizing substances for use in our process include ammonia, ammonium hydroxide, slaked or unslaked lime, calcium acetate, and caustic soda. If the neutralizing agent has limited water solubility at ordinary temperatures, a freely-flowing aqueous dispersion of fine particles of the agent can be used. Soda ash and other gas-producing agents are less desirable because they interfere with the most efficient liquid-liquid contacting of aqueous neutralizing substances and raw ester feed.

Advantageously, the process is conducted in counter-current fashion with the raw ester feed being admitted near the base of a packed or tray type extraction column, and the aqueous dispersion of neutralizing substances entering near the top. The aqueous extract is withdrawn from the bottom of the column and the raffinate from the top. The pressure of the operation is at least high enough to maintain liquid phase conditions throughout the operation, e.g. 50–150 p.s.i.g. or even higher when a reaction mixture of tertiary butyl acetate, unreacted isobutylene and acetic acid, and sulfuric acid are being treated.

The temperature of the operation generally is about room temperature, but can be higher or lower as desired providing that liquid phase conditions are maintained and undesirable side reactions avoided. (Our process can be used advantageously for "quenching" the condensation reaction of an olefin with the carboxylic acid in the presence of sulfuric acid or other mineral acid catalyst at an elevated temperature by reducing the temperature to retard or to halt the reaction while simultaneously removing the sulfuric acid and most of the carboxylic acid from the raw ester product.) The temperature should not be maintained above that point where any component in process cannot be rendered liquid by the pressure available, such limiting temperature being the lowest critical temperature of any of the substances present.

The strong mineral acid used as catalyst or condensing assistant for the manufacture of the esters generally will be sulfuric, but phosphoric, hydrochloric, nitric, and others also can be present alone or in mixtures in the ester-containing material to be treated. It appears that the selective neutralization of such acids in the presence of the carboxylic acid occurs readily because they have a greater degree of ionization or a "stronger" acidity than the carboxylic acid, this being an important consideration for the operation of our process.

Of the neutralizing agents those readily soluble in water are the most advantageous because they do not have to be maintained with agitation in storage to have a consistent quality. When acetic acid is the free carboxylic acid resent, a neutralizing agent such as calcium acetate (actually a metathesis reactant), can be advantageous for treating the mineral acid to give a calcium mineral acid salt, e.g. calcium sulfate which is largely separable as a solid, and additional acetic acid. Analogous situations apply with higher carboxylic acids than acetic.

Especially favored in our process is ammonium hydroxide neutralizing agent, which can be added to the wash water as an aqueous solution or as anhydrous ammonia. The ammonia or other neutralizing agent used is desirably sufficient in the aqueous extractant to neutralize all of the mineral acid without excess which would only act on the carboxylic acid.

In a special embodiment of our invention the aqueous dispersion of neutralizing substances is a saline solution containing amounts of salt approaching a saturation of the solution therewith, this in addition to the neutralizing substance. Ideally in this instance the saturating salt solute has a cation corresponding to that of the neutralizing substance and an anion corresponding to that of the mineral acid being neutralized. Thus, for example, in the case of neutralizing sulfuric acid with ammonia in our system, we can use about 5 to about 70 weight percent of ammonium sulfate with additional ammonium hydroxide as the extractant feed to the ester washing column. Furthermore, we can recycle ammonium sulfate solution resulting from treatment of the extract phase for recovery of other values therein, e.g. recovering unreacted carboxylic acid suitably in high strength and the accretion in ammonium sulfate (which is a valuable by-product for fertilizer and the like).

Referring to the drawing tower 14, a vertical column packed with Raschig rings, is fed at a low level (inlet 15) with a sour ester phase, typically the output of a reactor wherein isobutylene is condensed with acetic acid in the presence of sulfuric acid to make tertiary butyl acetate. Tower 14 also is fed at an upper level by an aqueous saline solution, e.g. 5 to 70% by weight ammonium sulfate entering inlet 12 and an aqueous neutralizing solution such as ammonium hydroxide entering inlet 10, the salt solution being optional but desirable. The extractant flows are mixed in pipe 13 and passed into tower 14 continuously. At the top of the column there disengages and settles a neutralized ester phase which is withdrawn through pipe 18. At the bottom of the column there disengages and settles an aqueous extract phase containing carboxylic acid and neutral salt resulting from the reaction of the neutralizing agent with the mineral acid present in the ester feed. It is withdrawn through pipe 17. The rate of feed of neutralizing agent entering the system through inlet 10 is regulated to be stoichiometric for forming a neutral (normal) salt of the mineral acid entering process through inlet 15. The fact that the salt resulting from the neutralization in the preferred instance is soluble in the aqueous extract phase promotes smoothly-running liquid-liquid processing for most advantageous operation.

The following examples show ways in which our invention has been practiced but should not be construed as limiting it. The extracting vessel used in each case was a vertical cylindrical austenitic stainless steel vessel packed with carbon Raschig rings and mounted essentially as depicted in the drawing. The volume of aqueous wash solution injected as extractant to the tower was ⅓ that of the sour ester, and both the extractant and sour ester feeding was continuous. The pressure in the runs was maintained at 150 p.s.i.g.

*Example 1.*—The aqueous extractant used in this test contained 1.39 weight percent of ammonia as ammonium hydroxide. It was contacted continuously in countercurrent manner at about room temperature with three times its volume of a tertiary butyl acetate-containing reaction product as the sour ester phase. The reaction was being conducted continuously by contacting the olefin and the carboxylic acid in the ratio of two mols of the isobutylene per mol of acetic acid in the presence of ½ weight percent sulfuric acid based on the weight of the initial mixture using at a temperature of 160° F. There was roughly 35 weight percent tertiary butyl acetate and a minute amount tertiary butyl alcohol in the sour ester feed, the balance being free sulfuric acid, unreacted acetic acid and isobutylene, and a little diluent hydrocarbon, principally isobutylene dimer.

The operation was maintained for 40 hours, the extract solution discharge containing about 28% acetic acid containing ammonium sulfate and only small amounts of other materials. The raffinate material collected was reduced in pressure to flash off isobutylene. The remaining raffinate liquid after flashing showed no mineral acidity and the presence of only very small amounts of water and acetic acid, thus being in excellent condition for working up safely without significant decomposition of the comparatively delicate tertiary butyl acetate product by distillation in conventional manner.

*Example 2.*—In this run, also operated continuously for 40 hours, the sour ester feed was essentially the same as that of Example 1 except that there was 1 weight percent sulfuric acid present therein, and the aqueous neutralizing extractant contained 2.78% ammonia (as ammonium hydroxide).

The operation was very smooth, and the results were substantially the same as those in Example 1, that is the raffinate being free of mineral acid and virtually all of the acetic acid for simple and effective recovery treatment, and the extract phase being of sufficient carboxylic acid concentration for economical recovery processing. In this operation the ammonium sulfate need not be separated as crystals from the aqueous extract solution, but instead part or all of the ammonium sulfate can be recycled in water solution into the inlet near the top of the extraction tower along with fresh makeup of aqueous neutralizing solution (or the recycle flow merely "spiked" with additional ammonia) to neutralize the free sulfuric acid entering process as a component of the sour ester phase. Such operation can continue satisfactorily until the extract solution approaches saturation with respect to ammonium sulfate, and thereafter ammonium sulfate increments can be cropped from the extract recovery treating system in a conventional manner.

We claim:

A process for separating a $C_3$-$C_5$ alkyl ester of a $C_2$-$C_5$ alkanoic acid from a mixture comprising said ester, sulfuric acid and a $C_2$-$C_5$ alkanoic acid formed by sulfuric acid catalyzed reaction of said alkanoic acid with a $C_3$-$C_5$ olefin which comprises contacting said mixture in liquid phase with an aqueous alkaline solution containing ammonia and ammonium sulfate, said ammonia being present in said solution in a concentration sufficient to neutralize said sulfuric acid, separating the resulting mixture into a raffinate phase consisting mainly of said alkyl ester and an aqueous extract phase containing said lower alkanoic acid and ammonium sulfate and recycling at least a portion of the ammonium sulfate present in said extract phase to provide make-up ammonium sulfate for said aqueous solution of ammonia and ammonium sulfate.

References Cited in the file of this patent

UNITED STATES PATENTS

| 2,041,193 | Lee | May 19, 1936 |
| 2,042,218 | Evans et al. | May 26, 1936 |

OTHER REFERENCES

Werntz: J. Am. Chem. Soc. 57, 204–206 (1935).
Gilman et al.: "Organic Syntheses," coll. vol. I, second edition, 1941, pp. 138–139.